G. M. BLOOM.
DRAIN PIPE CLEANER.
APPLICATION FILED APR. 1, 1909.
944,311.
Patented Dec. 28, 1909.
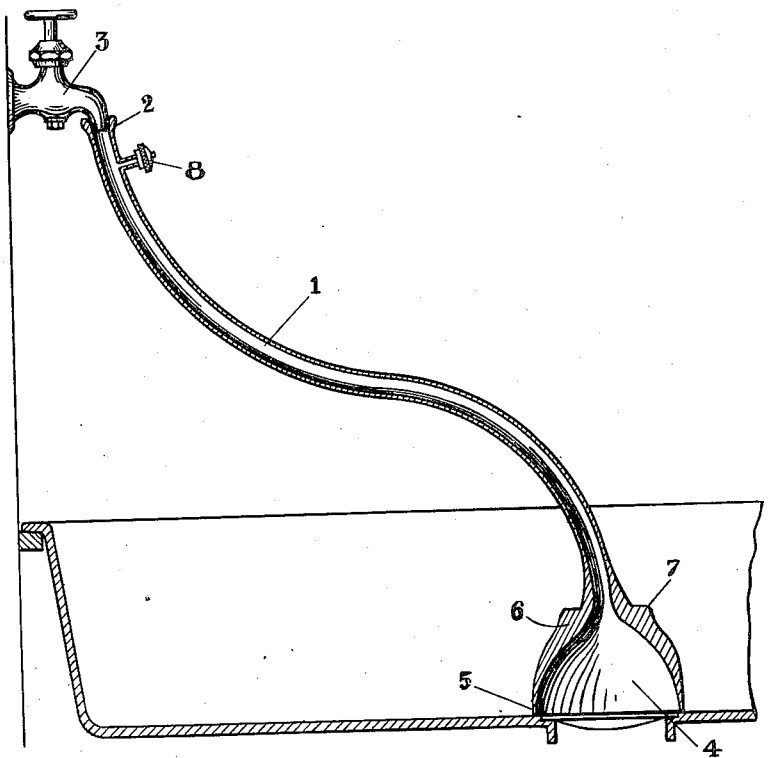
WITNESSES:
A. M. Shannon.
A. M. Dow.
INVENTOR
George M. Bloom
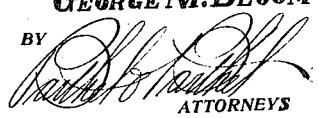
ATTORNEYS

UNITED STATES PATENT OFFICE.

GEORGE M. BLOOM, OF DETROIT, MICHIGAN.

DRAIN-PIPE CLEANER.

944,311. Specification of Letters Patent. Patented Dec. 28, 1909.

Application filed April 1, 1909. Serial No. 487,173.

*To all whom it may concern:*

Be it known that I, GEORGE M. BLOOM, a citizen of the United States of America, residing at Detroit, in the county of Wayne and State of Michigan, have invented certain new and useful Improvements in Drain-Pipe Cleaners, of which the following is a specification, reference being had therein to the accompanying drawings.

This invention relates to a cleaner for sink or wash-bowl drain pipes, and more especially to a certain arrangement thereof whereby an easily adjusted and readily sterilized device for the purpose is obtained which may be attached and used with ordinary fixtures without the use of tools, and which has also provision for application of compressed air, if desired.

The invention consists in the matters hereinafter set forth, and more particularly pointed out in the appended claims.

The drawing is a view in longitudinal section of a device embodying features of the invention in position for use in a sink.

Referring to the drawing, a flexible hose 1 of rubber or like suitable material has a contractile end 2 adapted to closely fit over an ordinary service cock 3, preferably formed by slightly increasing the thickness of the wall at this point, or it may be provided with an ordinary hose coupling for attachment. The other end of the hose is expanded to form a bell 4 having a flexible or yielding rim 5 adapted to conform to any surface against which it may be placed, and a reinforced non-collapsible upper portion 6 formed by increasing the wall. The latter is further stiffened by an outer, annular shoulder 7 which also forms a hand hold, so that a person gripping the bell may hold it firmly over the mouth of a sink drain or the like. An air valve or nipple 8 is likewise formed near the upper end 2.

In operation, the smaller end is attached to a sink cock by slipping it on as shown, and the user grasps the bell and holds it tightly over the mouth of the drain. By opening the cock, water is forced into the drain. If added pressure is desired an air force pump may be attached to the side nipple or valve.

The ease of attachment and readiness with which it may be cleansed constitute important features of the invention.

Obviously, changes in the details of construction may be made without departing from the spirit of the invention, and I do not care to limit myself to any particular form or arrangement of parts.

What I claim as my invention is:—

1. A drain and waste pipe cleaner comprising a hose of flexible material whose upper end is adapted to be secured to a service cock and whose lower end is enlarged into a bell mouth, the wall of the bell near the hose being thickened to form a non-collapsible zone, and the margin of the bell being reduced and softened to form a freely flexible lip, and a lateral air inlet nipple near the upper end.

2. A drain and waste pipe cleaner comprising a hose of flexible material fitted at one end for connection with a service cock and enlarged at the other into a bell mouth whose wall near the hose is thickened to form a non-collapsible zone, and whose margin is reduced in thickness to form a freely flexible lip, the bell wall at its thickened portion presenting a smoothly rounded interior and having an exterior annular shoulder forming a hand hold.

3. A drain and waste pipe cleaner comprising a hose of flexible material fitted at one end for connection with a service cock and enlarged at the other into a bell mouth whose wall near the hose is thickened to form a non-collapsible zone and whose margin is reduced in thickness to form a freely flexible lip, the bell wall at its thickened portion presenting a smoothly rounded interior and having an exterior annular shoulder forming a hand hold, and an air inlet nipple near the attachable end.

In testimony whereof I affix my signature in presence of two witnesses.

GEORGE M. BLOOM.

Witnesses:
C. R. STICKNEY,
A. M. SHANNON.